United States Patent Office 3,126,314
Patented Mar. 24, 1964

---

3,126,314
S-CHLOROPHENYLSULFONYLMETHYL - O, O - DI-ALKYLPHOSPHORODITHIOATE PESTICIDES
Llewellyn W. Fancher, Lafayette, and Gilbert G. Patchett, Oakland, Calif., assignors to Stauffer Chemical Company, a corporation of Delaware
No Drawing. Filed Oct. 24, 1960, Ser. No. 64,269
15 Claims. (Cl. 167—30)

This invention relates to certain new compositions of matter, the method of making the compositions, and the use of the compositions as insecticides and acaricides.

The compounds of the present invention have the general structural formula

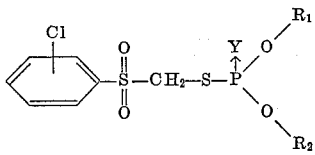

wherein $R_1$ and $R_2$ represent lower alkyl radicals which are preferably methyl or ethyl radicals, but which may be propyl, butyl or pentyl radicals and Y is oxygen or sulfur. The novel compounds of the present invention have a number of uses, and are particularly adapted for use as insecticides and acaricides.

The compounds of the present invention can be made in the following manner (code numbers have been assigned each compound and are used for convenience in referring to the compounds):

EXAMPLE I.—(R-100)

*S-(p-Chlorophenylsulfonylmethyl)-O,O-Diethyl-phosphorodithioate*

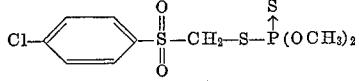

Into a 2-liter round-bottom flask bearing a stirrer, thermometer and dropping funnel was placed 34.3 grams (0.1 M) of 95% minimum p-chlorophenylthiomethyl-O, O-diethylphosphorodithioate, 100 cc. of benzene, 50 cc. of water and 50 cc. of glacial acetic acid. The mixture was stirred and cooled to 20° C. and a solution of 19.0 grams (0.12 M) of potassium permanganate dissolved in 475 cc. of water was added dropwise over a forty minute period. The temperature was allowed to rise to 27° C., then maintained at 25–26° C. by external cooling during the remainder of the addition. After all of the permanganate solution had been added, the mixture was stirred an additional hour at 25–26.5° C. A saturated aqueous solution of sodium bisulfite was then added in sufficient quantity to decolorize the solution. The clear, nearly colorless mixture was transferred to a separatory funnel and an additional one-hundred cubic centimeters of benzene was added and the liquids well mixed. After standing, the bottom aqueous layer was then drawn off and the benzene layer washed once with dilute aqueous sodium bisulfite and twice with 150 cc. portions of cold water. The benzene solution was then dried over anhydrous magnesium sulfate, filtered and the benzene removed by heating on a steam bath with an air jet. By this means, there was obtained 37.4 grams of nearly colorless liquid.

The crude product obtained was found by chromatographic and infrared analysis to contain some unreacted p - chlorophenylthiomethyl-O,O-diethylphosphorodithioate. By chromatographic technique, the pure sulfonedithiophosphate was obtained as a moderately viscous liquid, $N_D^{30}=1.5733$.

EXAMPLE II.—(R-103)

*S-(p-Chlorophenylsulfonylmethyl)-O,O-Diethyl-phosphorothiolate*

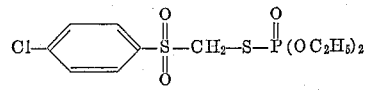

About 49.0 grams (0.15 M) of p-chlorophenylthiomethyl-O,O-diethylphosphorothiolate was dissolved in 50 cc. of glacial acetic acid. This solution was added dropwise over 0.5 hour to a stirred solution of 25.3 grams (0.16 M) $KMnO_4$ dissolved in 550 cc. of cold water. The initial temperature was 20° C. and as the addition proceeded, the temperature rose steadily to 37° C. at which temperature external cooling was instigated, and during the remainder of the addition the temperature was held at 35–37° C. After the addition was completed, the mixture was stirred at 33–37° C. for two hours, then cooled to 20° C. Sufficient saturated aqueous $NaHSO_3$ was added to decolorize the mixture. The mixture was then transferred to a separatory funnel and 150 cc. of methylene chloride was added and well mixed. The bottom layer, containing the product, was separated and washed once with 200 cc. of dilute NaCl solution, then dried over anhydrous magnesium sulfate and filtered. The crude product containing 79% of the sulfonemonothiophosphate weighed 46.3 grams. The pure compound obtained from the crude product was a viscous liquid, $N_D^{30}=1.5423$.

EXAMPLE III.—(R-105)

*S-(m-Chlorophenylsulfonylmethyl)-O,O-Dimethyl-phosphorothiolate*

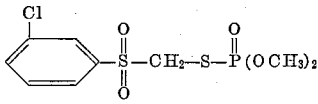

Fourteen and nine-tenths grams (14.9 gms.) (0.05 M) of m-chlorophenylmercaptomethyl - O,O - dimethylphosphorothiolate were dissolved in 78 ml. of glacial acetic acid. The mixture was stirred and warmed to 75° C., then 28.5 grams (0.25 M) (26 ml.) of 30% hydrogen peroxide was added dropwise over a one-half hour period maintaining the temperature between 75–80° C. during the addition. The reaction was completed by stirring at 80° C. for 4 hours. The mixture was cooled and diluted with an equal volume of benzene-ethyl ether (50/50) and made slightly basic with dilute sodium bicarbonate. The mixture was filtered to remove a small amount of insoluble solid material, the aqueous portion removed and the benzene-ether layer washed successively with dilute aqueous sodium chloride, dilute aqueous sodium bisulfite and again with dilute aqueous sodium chloride. After drying over anhydrous magnesium sulfate and filtering, the solvents were removed on a steam bath with an air jet. This viscous product weighed 7.3 grams (44% of theory), $N_D^{30}=1.5642$. Analysis showed the material to be 70–90% of the structure shown.

EXAMPLE IV.—(R-107)

*S-(o-Chlorophenylsulfonylmethyl)-O,O-Diethylphosphorodithioate*

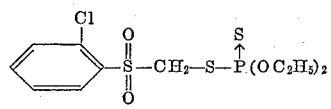

Twenty-four grams (24.0 gms.) (0.07 M) of o-chlorophenylmercaptomethyl - O,O - diethyl phosphorodithioate were dissolved in 105 ml. of benzene. To this solution was added 52 ml. of glacial acetic acid and 50 ml. of water. The mixture was stirred at room temperature while a solution of 22.1 grams (0.14 M) of potassium permanganate dissolved in 443 ml. of water was added dropwise over one hour and fifteen minutes, maintaining the temperature between 27–28° C. during the addition. The reaction was completed by additional stirring at 27–29° C. for two hours and forty-five minutes. An additional 50 ml. of benzene was added and the mixture decolorized by the addition of solid sodium bisulfite. The aqueous phase was separated and extracted twice with 50 ml. portions of benzene. The benzene fractions were combined and washed once with dilute aqueous sodium chloride, once with dilute aqueous sodium bicarbonate and again with dilute aqueous sodium chloride. After drying over anhydrous magnesium sulfate and filtering, the benzene was removed on a steam bath with an air jet. The viscous product weighed 21.5 grams (82% of theory), $N_D^{30}$=1.5797.

Chromatographic and I.R. analysis showed the product to be 43±4% of the structure shown. The $N_D^{30}$ of pure sample was 1.5733.

In one series of tests, the compounds of the present invention were made up in sprays and tested against the two-spotted mite, *T. telarius* (L.). Since it was thought that the compounds would be comparable in action to well-known commercial acaricides and insecticides, comparison tests were also made with Parathion (p-nitrophenyldiethyl thionophosphate) and Malathion (O,O-dimethyl phosphate of diethyl mercapto succinate). Other tests included comparisons with Systox (O,O-diethyl-O-2[ethyl mercapto] ethyl thiophosphate).

In one test of the compounds, dispersions were prepared by adding five grams of the toxic material to sufficient acetone to make 100 ml. of solution. This solution was then diluted with water containing 0.015% Vatsol (a sulfonate-type wetting agent) and 0.005% Methocel (methyl cellulose) as emulsifiers, the amount of water being sufficient to give concentrations of active ingredient ranging from 0.001 to 0.03%. Similar preparation were made containing Parathion and Malathion. All comparisons were made at the same concentrations of toxicant. The compositions were then sprayed on pinto bean plants, the plants placed in a greenhouse, dried and then infested with two-spotted mites. After seven days, the plants were examined both for post embryonic forms of the mite as well as eggs. The percentage of kill was determined by comparison with control plants which had not been sprayed. The following data were obtained:

MORTALITY

| Concentration, percent | Malathion | | Parathion | | R–100 | | R–103 | |
|---|---|---|---|---|---|---|---|---|
| | A[1] | E[2] | A | E | A | E | A | E |
| 0.03 | x | 0 | xxxx | 0 | 100 | 100 | 100 | 100 |
| 0.01 | x | 0 | xxx | 0 | 100 | 100 | 100 | 100 |
| 0.005 | x | 0 | x | 0 | 100 | 100 | xxxx | xxxx |
| 0.001 | x | 0 | x | 0 | x | x | x | x |

[1] A—Adults. [2] E—Eggs.
CODE: x=0–25%; xx=25–50%; xxx=50–75%; xxxx=75–100%; 100=100% kill.

In no case was it found that the compositions exerted phytotoxicity in the concentrations utilized.

The compounds of the present invention were tested as to whether they exerted systemic activity. The samples were made up in acetone and the required amount of this solution to give 100 p.p.m. was added to Erlenmeyer flasks which contained ordinary tap water. The roots of pinto bean plants were washed clean and placed in the flasks. A collar of cotton was wrapped around each plant to support it in the flask and to minimize the possibility of the two-spotted mites being killed by fumes. The plants were placed in a greenhouse and infested with two-spotted mites. After 72 hours, the plants were checked for live mites. The results were as follows:

| Material | Concentration, p.p.m. | Adults, 72 hr. Mortality | Phytotoxicity |
|---|---|---|---|
| Malathion | 100 | 100 | None. |
| Parathion | 100 | 0 | Do. |
| R–103 | 100 | 100 | Do. |

Some of the compounds were tested further using the same procedure, but different concentrations. The results were as follows:

| Material | Concentration, p.p.m. | Adults, 72 hr. Mortality | Phytotoxicity |
|---|---|---|---|
| Malathion | 50 | 0 | None. |
| R–102 | 50 | 100 | Slight burn on leaf edge. |
| | 25 | 100 | Do. |
| | 20 | 100 | None. |
| | 15 | 100 | Do. |
| | 10 | 100 | Do. |
| | 5 | 100 | Do. |
| | 2.5 | 100 | Do. |
| | 1 | xxx | Do. |
| R–103 | 50 | 100 | Do. |
| | 25 | 100 | Do. |
| | 20 | 100 | Do. |
| | 15 | 100 | Do. |
| | 10 | 100 | Do. |
| | 5 | xxxx | Do. |
| | 2.5 | xx | Do. |
| | 1 | x | Do. |

In a series of tests of the compounds designated R–105 and R–107 to determine the effects thereof against the two-spotted mite, dispersions were prepared as described earlier and the compositions sprayed on pinto bean plants which had been infested with a strain of the two-spotted mite obtained from a *T. telarius* colony. After 14 days, the plants were examined for post-embryonic forms of the mite and the eggs. The concentrations causing a 50% mortality are set forth in the table below. Similarly, compounds R–105 and R–107 were tested for systemic activity in the same fashion as described earlier using pinto bean plants which had been infested with two-spotted mites. The concentrations required to achieve LD–50 are set forth in the table below.

In a further series of tests of compounds R–105 and R–107, the compounds of this invention were tested against the house fly and the confused flour beetle. Stock solutions were made using 1 ml. light spray oil for 500 ml. acetone in which was dissolved 100 mg. of the toxicant per 10 ml. acetone. From this stock solution, serial dilutions were made until the desired concentration was obtained. The solutions were placed in 60 mm. diameter Petri dishes, and the acetone allowed to evaporate from the dish leaving only the toxicants suspended in spray oil. Cages containing 25 female flies or 20 adult beetles were then placed over the cage bottoms containing the Petri dishes with toxicant. The cages were held for 48 hours and mortality readings made. Concentration of the solution required to achieve LD–50 was noted. The required concentrations are set forth in the table below, expressed in micrograms per milliliter.

Further tests were made of the effectiveness of the compounds against the milkweed bug and the American roach. The compounds were weighed and dissolved in acetone. Serial dilutions were made by suspending measured amounts of the acetone solution in water with a wetting agent to make a total of 100 milliliters of suspension which was then sprayed into the screened end of each cage at a pressure of 25 p.s.i. for measured time. Mortality counts and LD–50 determinations were then made.

The purity of the compounds tested was as follows:

| | Percent |
|---|---|
| R-100 | 47 |
| R-103 | 79 |
| R-105 | [1] 70-90 |
| R-107 | 98 |

[1] Not chromatographed.

All the compounds but R-105 were chromatographed and the purities given are accurate within 2%.

| Example | House Fly, μg. | American Roach, Percent | Milkweed Bug, Percent | Confused Flour Beetle, Percent | Two-Spotted Mite | | |
|---|---|---|---|---|---|---|---|
| | | | | | P.E., Percent | Eggs, Percent | Systemic, p.p.m. |
| R-105 | 20 | .12 | .03 | >.12 | .01 | .01 | >1/5 |
| R-107 | 20 | .03 | .12 | >.12 | .001 | .001 | >100 |

When used as insecticides or acaricides, the compounds of the present invention are preferably compounded in the form of a dispersion for application. However, they may be applied as a solution in suitable solvents, such as acetone, and the like, or can be mixed with inert dust and applied as a powder. One particularly advantageous manner of applying the compounds of the present invention is to make them into the form of a wettable powder by the addition of a finely ground carrier or diluent such as Attaclay, a finely divided clay, containing a suitable wetting agent such as Duponal 51, a higher aliphatic alcohol sulfate wetting agent. Such powders can be readily mixed with water and applied as dispersions to infested plants.

This application is a continuation-in-part of application Serial No. 611,353, filed September 21, 1956, for Pesticidal Compositions of Matter.

We claim:

1. A compound having the formula

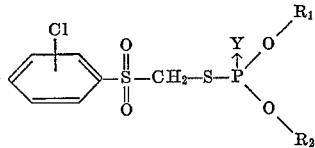

wherein $R_1$ and $R_2$ are each selected from the class consisting of methyl, ethyl, propyl, butyl and pentyl, and Y is selected from oxygen and sulfur.

2. S-(p - chlorophenylsulfonylmethyl)-O,O-diethylphosphorodithioate.

3. S-(p - chlorophenylsulfonylmethyl)-O,O-diethylphosphorothiolate.

4. S-(m-chlorophenylsulfonylmethyl) - O,O - dimethylphosphorothiolate.

5. S - (o - chlorophenylsulfonylmethyl) - O,O - diethylphosphorodithioate.

6. The method of killing pests of the orders Insecta and Acarina comprising applying to the pest habitat a composition containing as the essential active ingredient a compound having the formula

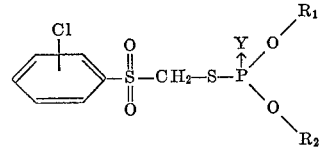

wherein $R_1$ and $R_2$ are each selected from the class consisting of methyl, ethyl, propyl, butyl and pentyl, and Y is selected from oxygen and sulfur.

7. The method of killing pests of the orders Insecta and Acarina comprising applying to the pest habitat a composition containing as the essential active ingredient S - (p - chlorophenylsulfonylmethyl) - O,O - diethylphosphorodithioate.

8. The method of killing pests of the orders Insecta and Acarina comprising applying to the pest habitat a composition containing as the essential active ingredient S - (p - chlorophenylsulfonylmethyl) - O,O - diethylphosphorothiolate.

9. The method of killing pests of the orders Insecta and Acarina comprising applying to the pest habitat a composition containing as the essential active ingredient S - (m - chlorophenylsulfonylmethyl) - O,O - dimethylphosphorothiolate.

10. The method of killing pests of the orders Insecta and Acarina comprising applying to the pest habitat a composition containing as the essential active ingredient S - (o - chlorophenylsulfonylmethyl) - O,O - diethylphosphorodithioate.

11. A pesticidal composition comprising a major amount of an inert pesticidal adjuvant and a minor amount of a compound having the formula

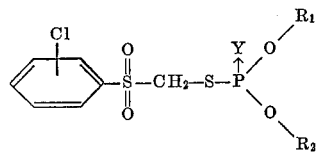

wherein $R_1$ and $R_2$ are each selected from the class consisting of methyl, ethyl, propyl, butyl and pentyl, and Y is selected from oxygen and sulfur.

12. A pesticidal composition comprising a major amount of an inert pesticidal adjuvant and a minor amount of S - (p - chlorophenylsulfonylmethyl)-O,O-diethylphosphorodithioate.

13. A pesticidal composition comprising a major amount of an inert pesticidal adjuvant and a minor amount of S - (p - chlorophenylsulfonylmethyl)-O,O-diethylphosphorothiolate.

14. A pesticidal composition comprising a major amount of an inert pesticidal adjuvant and a minor amount of S - (m-chlorophenylsulfonylmethyl)-O,O-dimethylphosphorothiolate.

15. A pesticidal composition comprising a major amount of an inert pesticidal adjuvant and a minor amount of S - (o - chlorophenylsulfonylmethyl) - O,O-diethylphosphorodithioate.

References Cited in the file of this patent

UNITED STATES PATENTS

| 2,494,126 | Hoegberg | Jan. 10, 1950 |
| 2,494,283 | Cassaday et al. | Jan. 10, 1950 |
| 2,963,505 | Muhlmann et al. | Dec. 6, 1960 |

FOREIGN PATENTS

| 804,141 | Great Britain | Nov. 12, 1958 |
| 1,039,511 | Germany | Sept. 25, 1958 |